(12) United States Patent
Susarla et al.

(10) Patent No.: US 8,046,422 B2
(45) Date of Patent: Oct. 25, 2011

(54) AUTOMATIC LOAD SPREADING IN A CLUSTERED NETWORK STORAGE SYSTEM

(75) Inventors: Sai Rama Krishna Susarla, Bangalore (IN); Michael R. Eisler, Colorado Springs, CO (US)

(73) Assignee: NetApp, Inc., Sunnyvale, CA (US)

( * ) Notice: Subject to any disclaimer, the term of this patent is extended or adjusted under 35 U.S.C. 154(b) by 1373 days.

(21) Appl. No.: 11/507,887

(22) Filed: Aug. 21, 2006

(65) Prior Publication Data
US 2008/0046538 A1    Feb. 21, 2008

(51) Int. Cl.
   *G06F 15/167*    (2006.01)
   *G06F 15/173*    (2006.01)
   *G06F 15/16*    (2006.01)
   *G06F 12/00*    (2006.01)

(52) U.S. Cl. ........ 709/213; 709/214; 709/230; 709/231; 709/226; 709/227; 711/113; 711/114; 711/122; 711/141; 711/213

(58) Field of Classification Search .................. 709/213, 709/214, 230, 231, 226, 227; 711/113, 114, 711/122, 141, 213
See application file for complete search history.

(56) References Cited

U.S. PATENT DOCUMENTS

| | | | |
|---|---|---|---|
| 6,725,342 B1 * | 4/2004 | Coulson | 711/141 |
| 7,085,883 B1 * | 8/2006 | Dalgic et al. | 711/114 |
| 7,103,740 B1 * | 9/2006 | Colgrove et al. | 711/162 |
| 7,254,636 B1 * | 8/2007 | O'Toole et al. | 709/230 |
| 7,631,023 B1 * | 12/2009 | Kaiser et al. | 1/1 |
| 2001/0049768 A1 * | 12/2001 | Kato et al. | 711/113 |
| 2002/0095554 A1 * | 7/2002 | McCrory et al. | 711/144 |
| 2002/0116457 A1 * | 8/2002 | Eshleman et al. | 709/203 |
| 2002/0116593 A1 * | 8/2002 | Kazar et al. | 711/202 |
| 2002/0165942 A1 * | 11/2002 | Ulrich et al. | 709/219 |
| 2003/0061399 A1 * | 3/2003 | Wagener et al. | 709/321 |
| 2004/0054777 A1 | 3/2004 | Ackaouy et al. | |
| 2004/0083289 A1 * | 4/2004 | Karger et al. | 709/226 |
| 2004/0249965 A1 * | 12/2004 | Huggins et al. | 709/231 |
| 2005/0004925 A1 * | 1/2005 | Stahl et al. | 707/100 |
| 2005/0010727 A1 | 1/2005 | Cuomo et al. | |
| 2005/0015471 A1 * | 1/2005 | Zhang et al. | 709/221 |
| 2005/0192932 A1 * | 9/2005 | Kazar et al. | 707/1 |
| 2005/0278383 A1 | 12/2005 | Kazar et al. | |
| 2006/0212697 A1 * | 9/2006 | Sato et al. | 713/150 |
| 2007/0088702 A1 * | 4/2007 | Fridella et al. | 707/10 |
| 2007/0101069 A1 * | 5/2007 | Corbett et al. | 711/141 |
| 2007/0162515 A1 * | 7/2007 | Sarma et al. | 707/201 |
| 2009/0222674 A1 * | 9/2009 | Leichsenring et al. | 713/193 |

OTHER PUBLICATIONS

Godbole, Rajesh, "An Introduction to FlexCache Volumes—Implementing File Caching on Filers" Network Appliance, May 2005, TR3399, http/www.netapp.com/library/tr/3399; 15pgs.
International Search Report and Written Opinion for International Application No. PCT/US2007/018431 dated Apr. 25, 2008.

* cited by examiner

*Primary Examiner* — Ario Etienne
*Assistant Examiner* — Ho Shiu
(74) *Attorney, Agent, or Firm* — Perkins Coie LLP

(57) ABSTRACT

A cache is used in a network storage system that includes a plurality of data storage nodes in a storage cluster, to automatically spread read and write access load, by a plurality of storage clients, for file system data and metadata, across the plurality of data storage nodes.

24 Claims, 5 Drawing Sheets

AUTOMATIC LOAD SPREADING IN A CLUSTERED NETWORK STORAGE SYSTEM

FIELD OF THE INVENTION

At least one embodiment of the present invention pertains to network storage systems, and more particularly, to automatic load spreading in a network storage system.

BACKGROUND

Various forms of network storage systems exist today, including network attached storage (NAS), storage area networks (SANs), and others. Network storage systems are commonly used for a variety of purposes, such as backing up critical data, providing multiple users with access to shared data, etc.

A network storage system includes at least one storage server, which is a processing system configured to store and retrieve data on behalf of one or more client processing systems ("clients"). In the context of NAS, a storage server is commonly a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

Recently, some storage servers have been designed to have distributed architectures, to facilitate clustering of storage nodes. Clustering facilitates scaling of performance and storage capacity. For example, rather than being implemented in a single box, a storage server may include a separate N-("network") module and D-(disk) module, which are contained within separate housings and communicate with each other via some type of switching fabric or other communication medium. Each D-module typically manages a separate set of disks. Storage servers which implement the Data ONTAP® GX operating system from NetApp can have this type of distributed architecture.

The design goals associated with network storage systems typically include the goal that the system should scale gracefully with available resources in three important areas: performance, availability and manageability. As an organization grows, to maintain a high level of productivity under larger workloads, its data infrastructure needs to be scaled up in performance as well as storage capacity while keeping costs low. Existing file systems have at least two limitations that inhibit their scalability under popular update-intensive (write-intensive) workloads and complicate data management: (i) the presence of bottleneck resources, and (ii) the need to do load-spreading and data migration tasks manually. For instance, performance and availability are limited as existing cluster designs statically map either all of a volume's files, metadata or directories to a single node, which becomes a single point of contention and failure. Also, administering a cluster becomes increasingly complex as its size is scaled to meet growing organizational needs. Manually performing common data management tasks, such as redistributing data to exploit additional machines or to work around failed machines, incurs significant system downtime and lost productivity.

Some existing clustered file systems scale a cluster's performance for read-mostly workloads by employing front-end caches that replicate data to offload the primary storage node for read accesses. However, replication degrades rather than improves performance for workloads that update (write) data frequently, such as most enterprise-scale document access and software development. To scale performance under such workloads, some clustered file systems statically partition volumes across multiple cluster nodes to spread load, which inhibits their scalability.

Moreover, organizations typically have significant investment in legacy data storage infrastructure, which cannot be easily replaced with newer clustered storage solutions. Such organizations need a performance-scaling solution that integrates well with existing infrastructure.

SUMMARY OF THE INVENTION

The present invention includes a method in which a cache is used, in a network storage system that includes a plurality of data storage nodes in a cluster, to automatically spread read and write access load from a plurality of storage clients, for file system data and metadata, across the plurality of data storage nodes.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
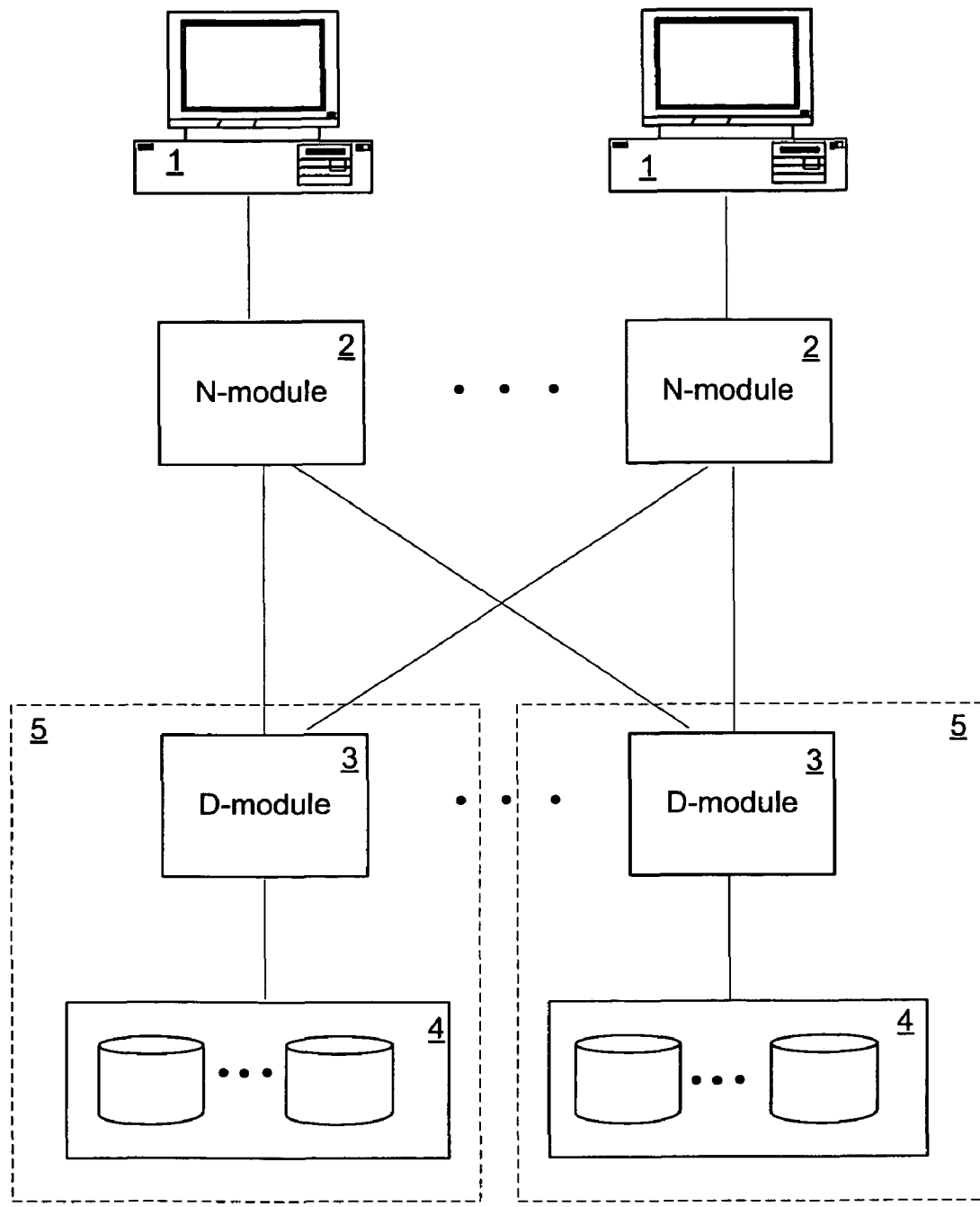
FIG. 1 shows an example of a clustered network storage system in which the invention can be implemented.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A method and apparatus to automatically spread data and metadata access load in a clustered network storage system are described below. Load spreading in this context refers to how a storage cluster's resources are utilized in handling client requests; the manner in which this is done can have a significant impact on the scalability and manageability of a storage cluster.

As described in greater detail below, the solution introduced here, according to at least one embodiment, involves striping a volume's file data accesses, metadata accesses and directory accesses across a dynamic pool of write-back persistent file system (PFS) caches. A "volume", as the term is used herein, is a logical data set which is an abstraction of physical storage, combining one or more physical mass storage devices (e.g., disks) or parts thereof into a single logical storage object, and which is managed as a single administrative unit, such as a single file system. A volume typically contains one or more files and directories.

The solution introduced here can be implemented in a distributed architecture that employs one or more N-modules cooperating with one or more D-modules. An N-module is an element that acts as a front-end of a storage server, exporting a file service abstraction to clients. A D-module manages the underlying storage. Note that while this description focuses on a distributed N-module/D-module architecture, the solution introduced here could alternatively be implemented in an architecture that employs one or more integrated storage servers, i.e., storage servers in which the N-module and D-module functionality are provided in a single box.

Caching such as described herein is implemented by one or more D-modules in a storage system. The actual physical storage used for caching in a D-module may be essentially any form of information storage device or devices, such as random access memory (RAM), flash memory, magnetic or optical disk(s), etc., or a combination thereof. To scale for read-mostly workloads, the solution introduced here employs read-caching of rarely updated files. Load-spreading can be enabled on a pervolume basis for read-scaling, write-striping, or both, via a user-specified configuration parameter. Read-scaling can be implemented by spreading read requests for any given file across different D-modules (e.g., for infrequently updated files). Write-striping can be implemented by sending writes to different files (or portions of files) to different D-modules. The system avoids cache contention by sending all client requests for a given file/directory to a single D-module (master or write-back cache), the identity of which is computed from the file identity by hashing. The system automatically adjusts to addition and removal/failure of caches.

Since the solution introduced here spreads file data, metadata and directory accesses dynamically across nodes, unlike earlier solutions, it significantly enhances a cluster's value in at least three aspects: linear throughput scaling, simpler management, and true single-copy failure resilience. For example, a cluster's delivered write and read throughput per volume scales linearly as more D-modules are deployed for caching. In contrast, previous solutions have bottlenecks that prevent linear scaling with cluster size. Simpler management is achieved in that the D-modules which store particular files or volumes are determined automatically, such that it is not necessary for an administrator to manually configure their storage locations. Single-copy failure resilience is provided by configuring all D-modules in cluster-failover (CFO) partnerships.

The solution introduced here provides for simpler management, at least to the extent that load-spreading and data migration tasks are fully automated. Administrators can simply provision a cluster with D-modules and storage for caching based on demand. There is no need to manually set up volume mirrors/stripes on specific D-modules or migrate data to spread load as with previous solutions.

Further, cluster data continues to be available for reads and writes even if any single D-module goes offline. In contrast, known previous solutions cannot support writes to any file of a volume when its master D-module goes offline.

The solution introduced here tracks file modification times to avoid read-caching frequently updated files, and only infrequently updated files are read-cached on multiple D-modules. This constraint, along with permitting only a single write-cache to exist for each file, allows strong coherence to be maintained (i.e., high confidence that each copy of a given set of data is up-to-date). The write-back caches offload writes from a volume's master D-module and push writes only for inclusion in periodic snapshots. (The term "snapshot" is used herein without derogation to any of NetApp's trademark rights.) Client writes are never lost due to cache failure, because the write-back caching is done only on D-modules that have a failover partner. Thus, the caching is transparent to clients, as it guarantees strong coherence and write-durability like a single CFO storage server pair (write-durability can be defined as the characteristic of providing a high level of confidence that written data will not be lost once the write is acknowledged to the requester). Furthermore, the solution introduced here can be implemented on top of an existing clustered infrastructure.

The term "read", as used herein, is intended to mean any operation that queries the state of data or metadata in a storage system without updating that data or metadata. "Reads" therefore include, for example, Get Attribute (getattr) operations, in addition to actual reads per se, and other operations, as will be recognized by those skilled in the art. The term "write", as used herein, is intended to mean any operation that modifies data or metadata in a storage system. "Writes" therefore include, for example, Set Attribute (setattr) operations, in addition to actual writes per se, and other operations, as will be recognized by those skilled in the art.

Refer now to FIG. 1, which shows an example of a clustered network storage system in which the invention can be implemented. In one embodiment, the system includes a number of N-modules 2 and a like number of D-modules 3. Each N-module 2 is coupled to a corresponding local D-module 3, with which it is associated, and is further coupled through an appropriate communications infrastructure to every other D-module 3 in the system.

The system further includes a number of storage subsystems 4. Each of the storage subsystems includes multiple disks. In other embodiments, however, a mass storage subsystem 4 could include other types of nonvolatile mass storage devices, such as semiconductor-based mass storage, tape-based mass storage, etc. Each D-module 3 manages the back-end storage functions (i.e., data storage and retrieval) for a particular one of multiple storage subsystems 4. Each D-module 3 and its corresponding storage subsystem 4 may be viewed as a separate one of multiple clustered data storage nodes 5, or "cluster nodes" 5. Note that in other embodiments, a "cluster node" could be defined differently.

The system further includes multiple clients 1, each of which is assigned to a particular N-module 2 to which the client directs its read and write requests for purposes of accessing network data storage. The clients 1 may communicate with their respective N-modules 2 using one or more conventional network storage oriented protocols, such as Network File System (NFS), Common Internet File System (CIFS), or any other suitable protocol. A given N-module can direct a received data access request (i.e., a read or write request) either to its local D-module or to another D-module, as described further below. Any combination of an N-module 2 and a D-module 3 can be considered to be a complete storage server.

Figure 2:
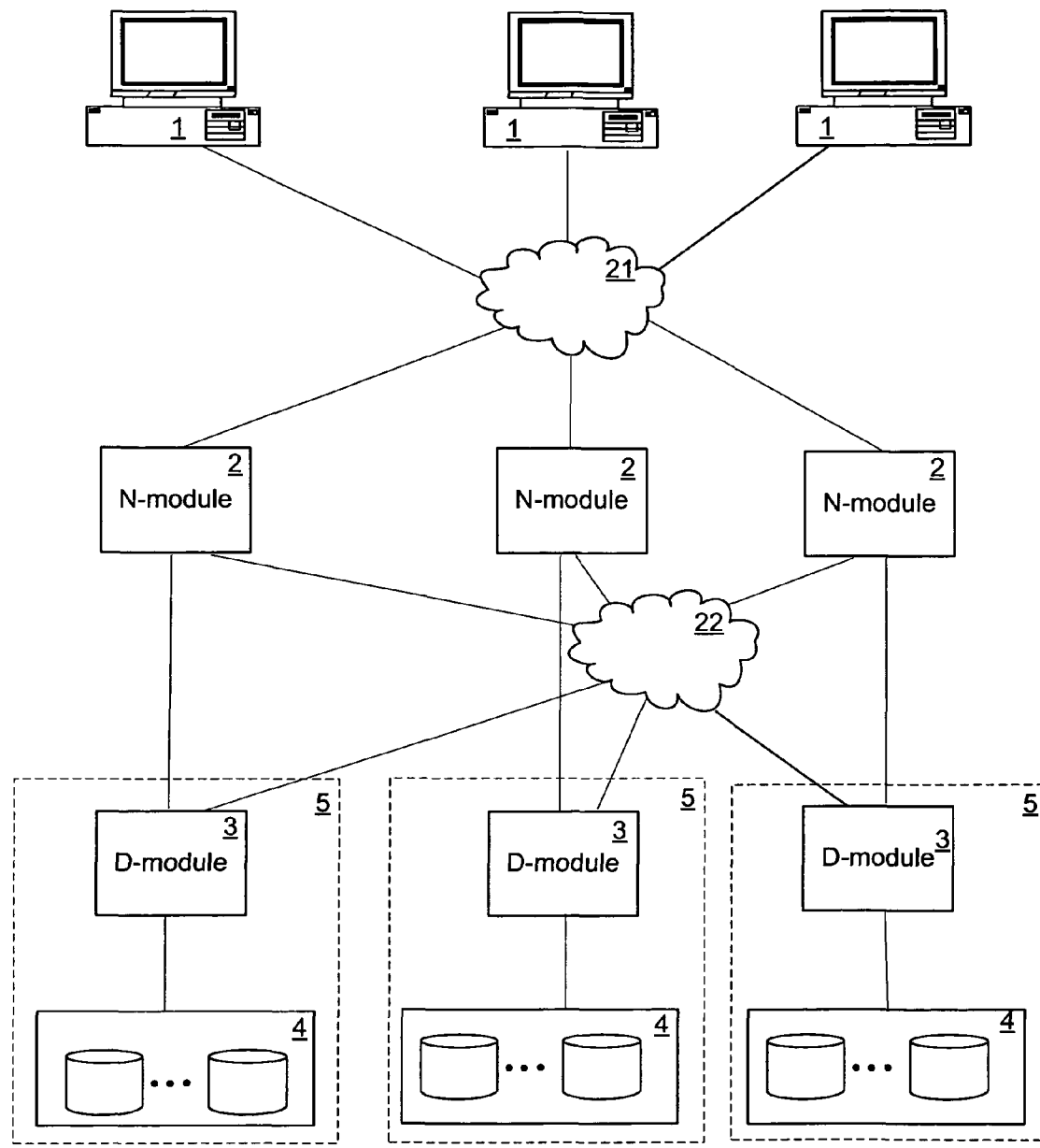
FIG. 2 shows the system of FIG. 1 in greater detail, according to certain embodiments.

FIG. 2 shows the system of FIG. 1 in greater detail, according to one embodiment. The clients 1 communicate with the N-modules 2 through a communications infrastructure 22. The communications infrastructure 21 can be a network, such as a local area network (LAN), wide area network (LAN), metropolitan area network (MAN), a global area network (GAN) such as the Internet, a storage area network (SAN), or a combination of such networks.

As also shown in FIG. 2, each of the N-modules 2 is connected, either directly or indirectly, to each of the D-modules 3. In particular, an N-module may have a direct (i.e., point-to-point) connection to its corresponding D-module and may also communicate through a communications infrastructure 22 with each of the other D-modules. The communications infrastructure 22 can be a network, such as a LAN, WAN, MAN, GAN (e.g., the Internet), SAN, or a combination of such networks.

As mentioned above, the solution introduced here employs a set of multiple write-back PFS caches on a cluster's data storage nodes 5. More specifically, each D-module 3 in the system implements a local write-back PFS cache. In "write-back" caching, data written to the cache are not copied to the main storage facility until absolutely necessary (in contrast with "write-through" caching, in which all writes are written to both the cache and to the main storage facility in parallel). Write-back caching employed in the manner described here reduces a volume's metadata and directory write loads at its master D-module and scales write throughput. To ensure that client writes are never lost due to a cache crashing, write-back caching can be limited to only nodes that have failover partners. If writes at caches are protected in this way, they need not be aggressively written back (committed) to the origin node, except for taking periodic snapshots of the origin volume. Note that while this description details the use of write-back caching (among other functionality), other embodiments of the solution introduced here could conceivably implement other types of caching methodologies.

This approach provides at least four important advantages: 1) elimination of hot spots (D-modules with disproportionately heavy loads) via dynamic file/directory-grain access striping; 2) resilience against single node failures; 3) linearly scalable read and write performance; and 4) plug-and-play cache management.

Technology currently is available that allows a storage server, such as a filer, to be used to provide write-through caching of files maintained by another ("origin") storage server, to improve performance. Such capability is provided by FlexCache, which is an optional feature of the Data ONTAP storage operating system from NetApp. With current versions of FlexCache, a file's read load can be spread across multiple caches; however, all writes must go to the master copy of the file. Technology such as this can be modified/extended to provide write-back caching, to provide the basic write-back PFS caching functionality described herein. It should be understood, however, that the solution introduced here goes beyond merely providing write-back PFS caches in a storage cluster, as described further below.

The write-back functionality can be implemented by using write delegations as defined in Network File System (NFS) version 4 (NFSv4) to allow a cache to continue writing its local file copy without contacting the origin D-module, as long as other caches do not access that file. A file's read-write D-module obtains a write delegation from the origin D-module with an infinite lease (as defined in NFSv4) to prevent loss of client writes. Read-only caches ("read caches") obtain time-limited read delegations (per NFSv4) to enable the delegating entity (the origin D-module) to recover from a failure of any of any cache that has received a delegation.

Since no two caches contend for write access to the same file, a cache keeps a write delegation until the cache is retired (e.g., removed from the cluster or taken offline) and incurs no coherence traffic. Writes at a cache are protected against cache failure and hence need not be frequently written back (committed) to the origin; however, they still should be written back to the origin D-module to be included in periodic "snapshots" of the origin volume, which normally occurs much less frequently than writes (by an order of magnitude).

The caching employed according to the solution introduced here is transparent to clients. To clients, a cluster node semantically behaves the same as a stand-alone storage server (but more scalable), as it guarantees strong data coherence and durability of client writes.

The solution introduced here employs two complementary mechanisms to avoid performance "hot spots". First, only a single read-write copy is maintained of each file and each directory, to avoid contention among D-modules. To offload a volume's master D-module, the read-write copy of different files and directories of the volume are mapped to different D-modules, by hashing their file handles. When a client write request arrives at an N-module, the N-module sends the request to the D-module designated to hold that file's (or directory's) read-write copy (referred to as the "read-write D-module").

Second, when a file or directory is heavily read but rarely updated, to scale its read bandwidth, multiple read-only copies are maintained in the cluster's caches. However, strong coherence is enforced for all data as described above, regardless of which copy serves it, to ensure that the caching is transparent to clients. When a client read request arrives at an N-module, the N-module efficiently decides whether to send the request to its local D-module for read caching or to the file's read-write D-module.

Of course, write-back caching can be implemented without read caching, and vice versa, if desired. However, combining read caching and write caching in this way provides better performance under certain conditions, such as read-mostly workloads.

Figure 3:
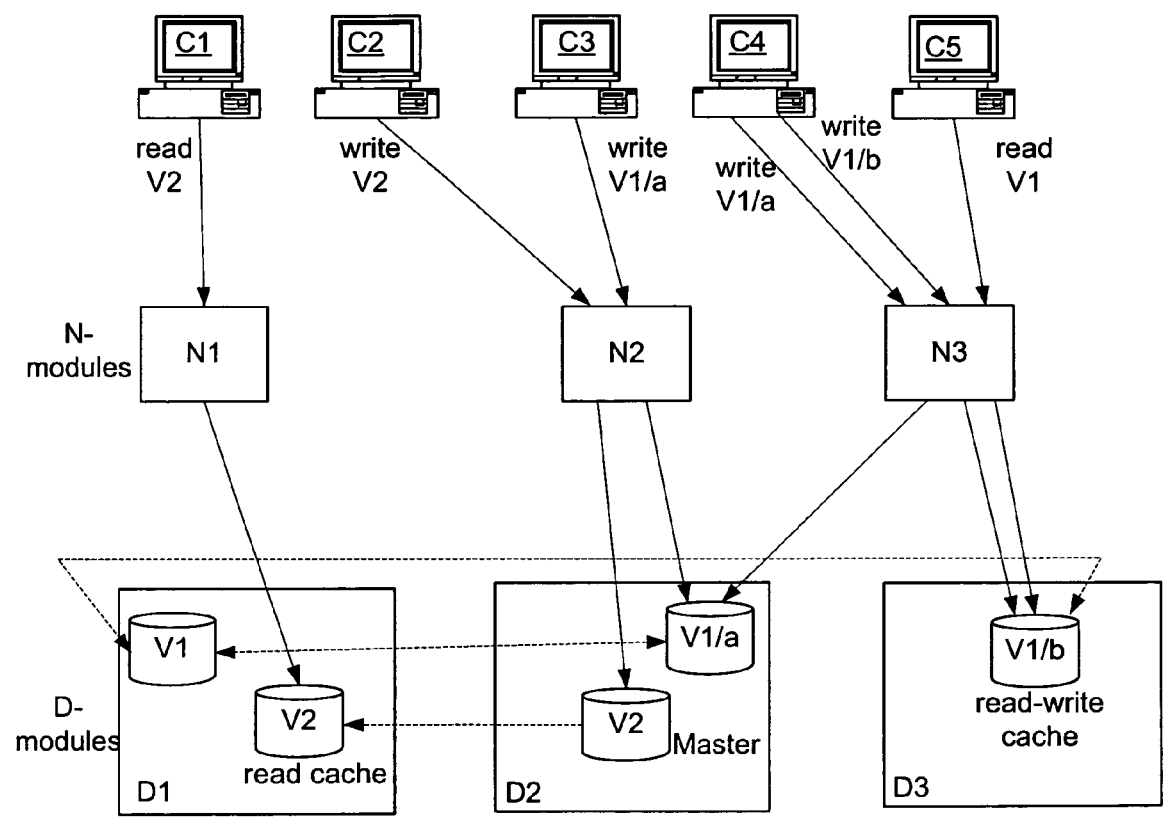
FIG. 3 illustrates an example of the configuration and operation of a clustered storage system when a set of persistent file system (PFS) write back caches is deployed, in accordance with an embodiment of the invention.

FIG. 3 illustrates an example of the configuration and operation of a clustered storage system when a set of PFS write-back caches is used in accordance with the solution introduced here. In general, each N-module forwards client reads to its local D-module and forwards client writes to D-modules computed based on the requested files' identities (e.g., file handles). Note that client requests can relate to units of data other than files, such as volumes, directories, individual data blocks or ranges of data blocks, etc. Regardless of the unit of data involved in the request, the manner of determining which D-module the request is sent to is the same.

Writes on different files in a volume can be directed to different D-modules. For example, as shown in FIG. 3, writes on File a in volume V1 (i.e., file "V1/a") and File b in volume V1 (i.e., file "V1/b") can be directed to different D-modules. However, all writes to any particular file are sent to the same D-module, to avoid data synchronization overhead among caches. For example, clients C3 and C4 write to file V1/a by sending writes to their respective N-modules, but the N-modules direct both of these writes to D-module D2.

More specifically as shown in FIG. 3, a master (read-write) copy of a particular volume, V1, is stored by D-module D1, and a master copy of another volume, V2, is stored by D-module D2. D-module D1 also maintains a cached read-only copy of volume V2. Read-only caching is employed for volume V2. Although not shown, D-module D3 could also have a read-only copy of volume V2. D-modules D2 and D3 each also maintain a cached read-only copy of volume V1. Furthermore, D-module D1 also maintains a cached read-write copy of file V1/a, and D-module D3 also maintains a cached read-write copy of file V1/b.

When client C1 sends a request to read volume V2 to N-module N1, N-module N1 directs that request to its local D-module, D1, and the request is serviced from the cached copy of volume V2 stored in D-module D1. Similarly, when client C5 sends a request to read volume V1 to N-module N5, N-module N5 directs that request to its local D-module, D5, and the request is serviced from the cached copy of volume V1 stored in D-module D5.

When client C2 sends a request to write to (modify) volume V2, N-module N2 will compute a hash value based on that volume's handle, to identify the D-module where the (single) read-write copy of that volume is stored (which in the illustrated example is D-module D2), and the request will be directed to that the D-module. The details of the hash function are unimportant for purposes of the technique being introduced here. Essentially any conventional hash function can be used. When client C3 sends a request to write file V1/a, N-module N2 will compute a hash value based on that file's file handle, to identify the D-module where the (single) read-write copy of that file is stored (which in the illustrated example is D-module D2), and the request will be directed to that the D-module. Similarly, when client C4 sends a request to write file V1/b, N-module N3 will compute a hash value based on that file's file handle, to identify the D-module where the (single) read-write copy of that file is stored (which in the illustrated example is D-module D3), and the request will be directed to that the D-module.

Figure 4A:
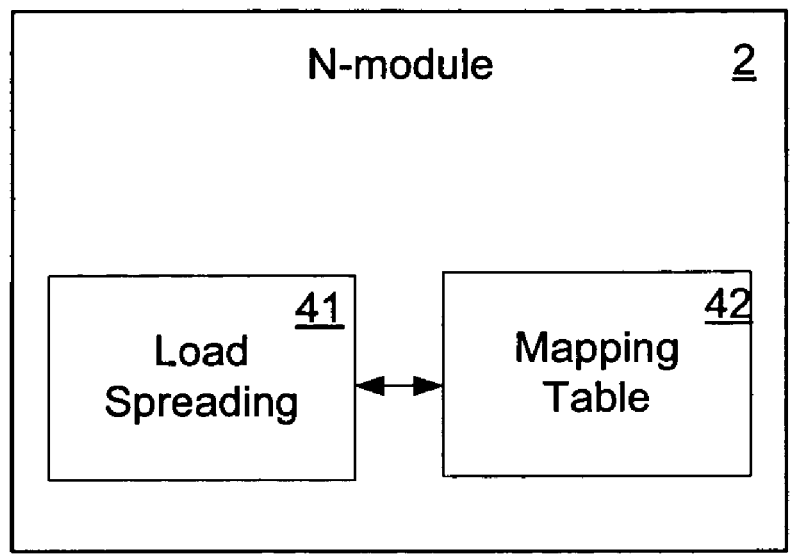
FIG. 4A illustrates certain internal elements of an N-module.
Figure 4B:
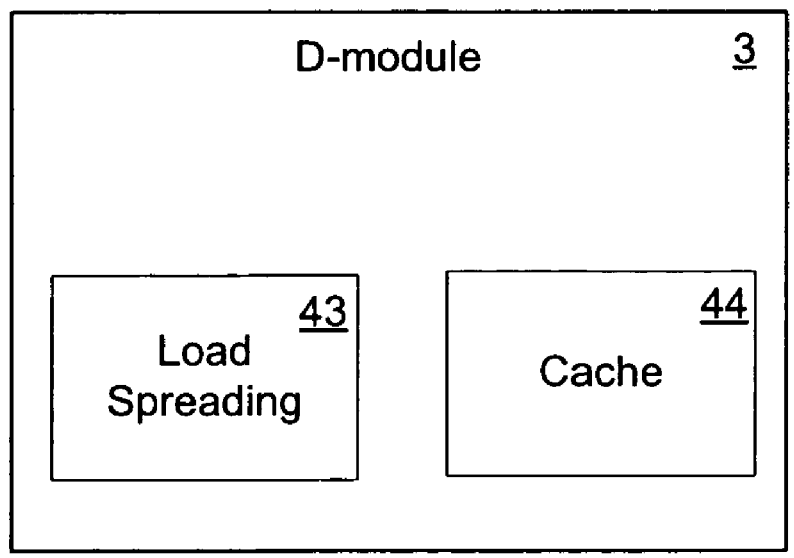
FIG. 4B illustrates certain internal elements of a D-module.

Referring now to FIGS. 4A and 4B, the functionality described above can be implemented collectively by a load spreading module 41 running in each N-module 2 and a corresponding load spreading module 43 running in each D-module 3. Modules 41 and 43 can be implemented in the form of software, although they could alternatively be implemented in circuitry specifically designed for that purpose. The load spreading module 43 in each D-module 3 implements the write-back and read caching functionality. The actual cache 44 of each storage node in the cluster resides in the D-module 3. The physical storage for the cache 44 may be implemented in any suitable type(s) of storage device(s), such as a form of random access memory (RAM). The load spreading module 41 in each N-module 2 is responsible for directing client requests to the appropriate cache (i.e., to the appropriate D-module 3).

The initial assignment of the read-write copy of a file to a particular D-module can be done randomly (e.g., when that file is initially created). When a client write request arrives at an N-module, the N-module sends the request to the D-module designated to hold the file's read-write copy. To identify that D-module, the N-module first hashes the cluster-wide identifier (ID) of the volume which contains the file and the file's file ID (collectively called the "file handle"), and uses the hash to index into the mapping table 42, to identify the D-module. The mapping table maps 42 file handles to D-modules and is kept fully replicated in all N-modules. When indexing into the mapping table, different weights can be assigned to D-modules, such that file are mapped to D-modules based on their individual machine capacity (e.g., processing power) and observed load distribution. For example, a D-module with a relatively high capacity or a relatively low observed load might be assigned a greater weight in the mapping table than other D-modules, in order to spread the load more evenly. When write caching is disabled for a volume (e.g., via a user-set option), the volume's master D-module is chosen by default to be the read-write D-module for all of the volume's files/directories.

The hash algorithm implemented by the N-modules is designed to distribute a volume's read-write load for files, directories and metadata, uniformly across the available caching D-modules. The algorithm minimizes hot spots in a cluster and automatically adjusts to the addition or removal of caches. Note that there are hash functions well known in the art that meet these criteria and reduce the need to rehash file locations whenever caches are added/removed. Further details of the hash function are not necessary for an understanding of the technique introduced here.

When a client read request arrives at an N-module, the N-module decides, in a manner designed to optimize read performance, whether to send the request to its local D-module for read caching or to the file's read-write D-module. Read caching improves file performance only when reads are much more frequent than updates. Hence, the N-module can base its decision on the observed frequency of writes to the file, which is best captured at the file's read-write D-module.

Determining the frequency of writes to a file can be accomplished as follows. The read-write D-module monitors file updates (e.g., based on the file modification time) and sets a "read-cache" bit in the outgoing file handle (e.g., NFS file handle) only if the file has not been updated relatively recently (e.g., within the last few minutes, as indicated by the file's modification time). Before giving out a file handle to clients, an N-module sets the read-cache bit after obtaining the file handle from the file's read-write D-module. Subsequently, when an N-module sees an incoming read request with this bit set in its file handle, the N-module sends the request to its local D-module, regardless of whether that local D-module contains the read-write copy of the data being accessed. If the bit is not set, the request is instead directed to the D-module which has the read-write copy of that data. This scheme responds to changes in update behavior at the time of supplying a file handle to clients (which usually happens during a client-initiated "open" operations).

Figure 5:
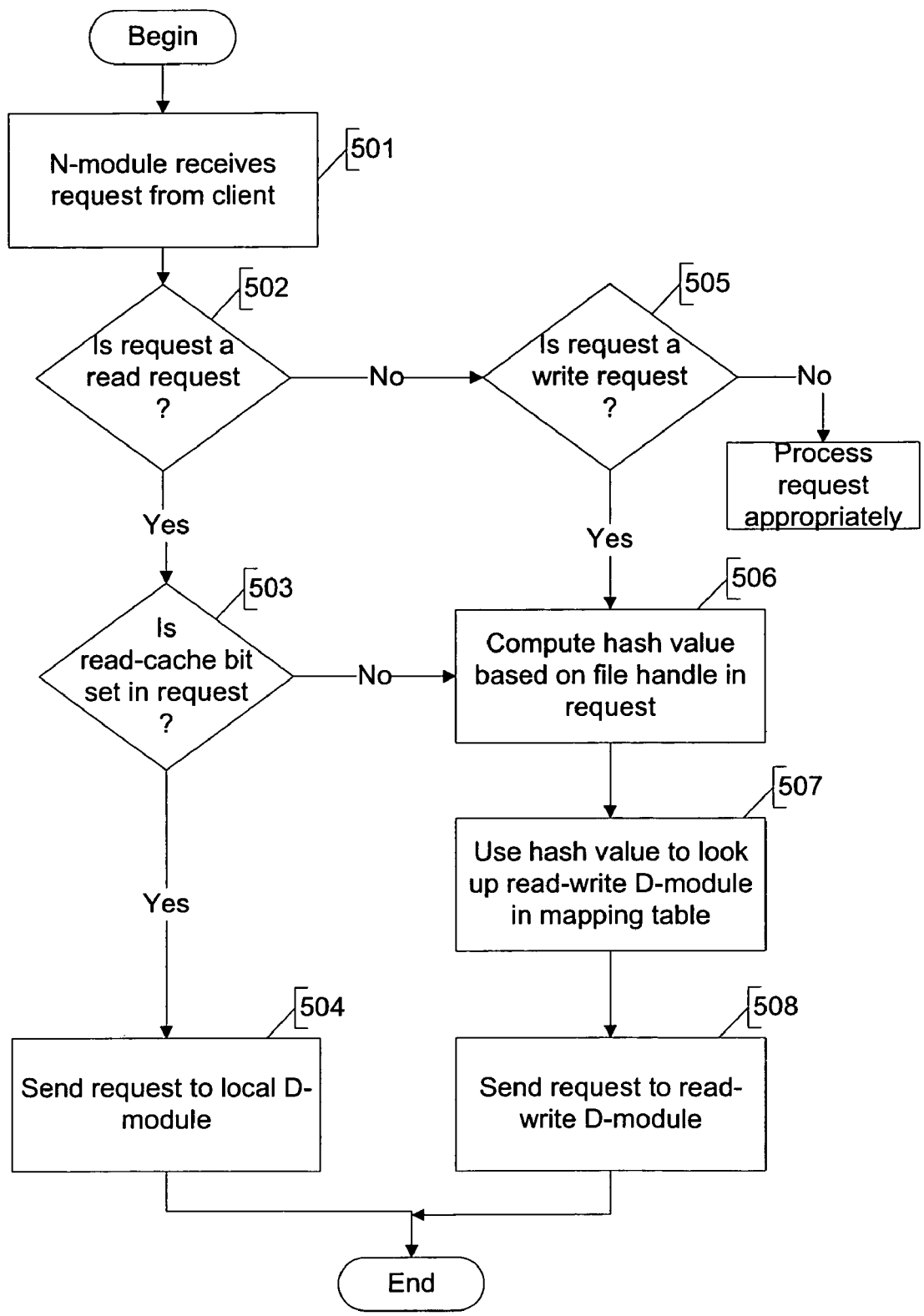
FIG. 5 illustrates an example of the processing of a client request by an N-module.

FIG. 5 illustrates an example of the processing of a client request by an N-module. This example is for a scenario which employs both adaptive read caching based on observed file update frequency and write-back caching, as described above. The update frequency of each file can be observed (measured) by the D-module which holds the write delegation for that file. At 501, an N-module receives a client request. If the request is a read request (502), then the N-module determines at 503 whether the read-cache bit in the file handle of the request is set. If the read-cache bit is set, that indicates that the requested file is not a frequently updated file. In that case, the process proceeds to 504, where the N-module directs the read request to its local D-module. From this point, servicing of the request proceeds in the usual manner.

If the request is a write request (505), or if the request is a read request but the read-cache bit is not set (meaning that the file is frequently updated) (503), then the process proceeds to 506, in which the N-module computes the hash value from the file handle in the request, as described above. The N-module then uses that hash value to index into its mapping table 42 (FIG. 4A), to look up the read-write D-module for that file, and sends the request to the read-write D-module at 508. From this point, servicing of the request proceeds in the usual manner.

The example of reading/writing a file is used here to simplify description. Reading or writing a directory or metadata can be handled in essentially the same way as reading or writing a file.

With the above-described caching scheme, read-write copies of a cluster's files, directories and metadata can be uniformly spread among available D-modules. When a network administrator adds a D-module to the cluster, the mapping table 42 is augmented (either automatically or manually by the administrator) to include an entry for that D-module. Subsequent hash computation at the N-modules will cause the N-modules to forward writes for some files to the new D-module. The underlying caching protocol will cause those files' contents and write privileges to be pulled from their previous read-write D-modules, offloading them proportionately.

When a D-module is retired (e.g., manually by a network administrator or automatically in response to a failure that causes it to become unavailable), its entry gets deleted from the mapping table 42. As a result, the hash computation in the N-modules causes all of that D-module's read-write files to be mapped to a different D-module. The caching protocol will cause the affected files and their privileges to be migrated away automatically.

Identifying the read-write D-module based on file ID can be problematic when a client operation involves updating more than one file or directory (e.g., a rename operation involving two directories). In this case, an N-module can perform the operation on the read-write D-module for one of the directories, e.g. the directory with the lower file ID (for uniqueness). This causes the D-module to pull the other directory's write privileges away from its owner. The disruption caused this action is expected to be minimal, however, because such rename operations are relatively infrequent compared to normal file accesses.

Caching such as described herein can be selectively enabled on a volume-by-volume basis. To enable caching of a given volume's contents, a network administrator can set an attribute of that volume (e.g., from a management console). For example, the attribute may be specified as vol option <volname> caching [off|rdonly|wronly|rdwr]

where "rdonly" keynotes read-only caching (useful for read-mostly workloads), "wronly" denotes write-back caching with no read-only caching (useful for personal workloads), and "rdwr" keynotes write-back caching with adaptive read caching based on the observed file update frequency (useful for fluctuating sharing patterns).

When a cluster's administrator adds a new D-module to the cluster, the administrator can optionally dedicate an aggregate on the D-module for caching and assign some or all of the D-module's storage to that aggregate. An "aggregate" is a logical aggregation of physical storage, which contains or provides storage for one or more other logical data sets at a higher level of abstraction (e.g., volumes). The administrator would then add that D-module to the mapping table in each N-module. When the D-module receives a file request in a volume that is not present locally, its load spreading module 43 will automatically create a PFS sparse volume for that file, called a "Vcache", in the local caching aggregate and cache the file from its origin. In this context, a sparse volume is a partial copy of a volume maintained on another network node, used in a cache for caching purposes, which appears to any client to be a complete copy of the volume but which actually contains only essential metadata of the volume (e.g., directory/file hierarchy) and those files which the cache has retrieved in order to service client requests.

When a D-module is retired, its caching aggregate is taken off-line. In response, any outstanding updates in the local VCaches are pushed to their respective origin volumes, and the D-module is deleted from the cluster's mapping table. If the aggregate is being deleted, it also removes its Vcaches from local storage.

As mentioned above, the files of a volume can be striped across multiple D-modules, e.g., by caching different files in different D-modules. Also, a particular file can also be striped across multiple D-modules in essentially the same manner, where different portions of the file are cached on different D-modules. To do this, the offset of the file stripe being accessed would be computed based on the file's stripe size and the file offset, and included in the hash computation mentioned above (in addition to the volume ID and file ID).

In addition, multiple hierarchical levels of caching can be applied using the basic approach described above to improve load spreading. This may be useful to help reduce the client access load on any particular machine that is heavily loaded. For example, a first level of caching can be used to stripe a volume across multiple caches (D-modules), as described above. This involves logically dividing the volume into subsets (e.g., individual files or groups of files) via the hashing technique described above and caching each subset of the volume in a particular D-module. However, if a particular subset cached in a particular cache is extremely "hot" (i.e., is the target of a disproportionately large number of client reads or writes), then that subset can be further striped across one or more other caches (i.e., a second level of caching) on one or more other machines. The second level of caches may include at least some of the same physical caches that make up the first level, or it may be a completely separate set of caches. This approach can be extended further to provide additional levels of caching (i.e., for caching smaller and smaller volume subsets), as necessitated by the client access load.

Thus, a method and apparatus for automatically spreading data and metadata access load in a clustered network storage system have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   operating a clustered storage server system that includes a plurality of data storage nodes configured to operate as a cluster, each of the data storage nodes including an N-module, a D-module, and a separate one of a plurality of caches, and each of the data storage nodes being associated with a separate one of a plurality of nonvolatile mass storage subsystems, wherein operating the clustered storage system includes maintaining, in each of the N-modules, a data structure indicating a mapping between D-modules and data identifiers of data stored in the network storage system; and using the plurality of caches to automatically spread read and write access load for file system data and metadata, by a plurality of storage clients, across the plurality of data storage nodes, including:

receiving, at one of the N-modules, a read request directed to a first dataset;

selecting, by said one of the N-modules, either a caching D-module for the first dataset or a read-write D-module for the first dataset, from which to access the first dataset, based on the mapping and an indication whether the first dataset has been updated at the read-write D-module within a threshold time;

directing, by said one of the N-modules, the read request to either said caching D-module or said read-write D-module selected in said selecting;

receiving, at one of the N-modules, a write request directed to a second dataset;

determining one of the D-modules at which to access the second dataset, based on the mapping and a data identifier indicated by the write request; and directing the write request to said one of the D-modules determined in said determining.

2. A method as recited in claim 1, further comprising:
operating a plurality of clustered storage server modules, wherein each of the caches is associated with a separate one of the storage server modules, and wherein each cache caches a copy of data managed by one or more of the storage server modules other than the storage module with which the cache is associated.

3. A method as recited in claim 1, wherein using the plurality of caches comprises:
caching a plurality of copies of a dataset in different ones of the data storage nodes;
receiving from a client a data access request relating to the dataset; and
selecting one of the cached copies of the dataset from which to service the request, based on an update frequency of the dataset.

4. A method as recited in claim 3, wherein:
caching a plurality of copies of the dataset comprises
storing a read-only copy of the dataset in at least one of the plurality of data storage nodes; and
storing a read-write copy of the dataset in only one of the plurality of data storage nodes.

5. A method as recited in claim 4, wherein the data access request is a read request, and wherein selecting one of the cached copies of the dataset from which to service the request comprises:
allowing the read request to be serviced from one of the read-only copies if the dataset is not considered to be a frequently updated dataset; and
servicing the read request only from the read-write copy if the dataset is considered to be a frequently updated dataset.

6. A method as recited in claim 1, wherein the cluster contains a plurality of volumes of data, the method further comprising:
selectively enabling or disabling use of the caches to automatically spread read and write access load, on a volume-by-volume basis.

7. A method as recited in claim 1, wherein using the plurality of caches comprises write caching data in a volume, including:
creating only one read-write copy of each individual file of a plurality of individual files of the volume; and
assigning the read-write copy of each individual file to a particular one of the data storage nodes, such that the read-write copy of two or more individual files of the volume are assigned to different data storage nodes.

8. A method as recited in claim 7, wherein using the plurality of caches further comprises read caching data in the volume, including:
creating at least one read-only copy of at least one file of the volume, and
for at least one file of the volume, assigning a read-only copy of the file to different ones of the data storage nodes.

9. A method as recited in claim 8, wherein using the plurality of caches comprises:
creating only one read-write copy of each directory of the volume;
assigning the read-write copy of each directory of the volume to a particular one of the data storage nodes, such that the read-write copy of different directories of the volume are assigned to different data storage nodes;
creating at least one read-only copy of at least one directory of the volume, and
for at least one directory of the volume, assigning a read-only copy of the directory to different ones of the data storage nodes.

10. A method as recited in claim 7, further comprising accessing said read-only copies according to an update frequency of the file.

11. A method as recited in claim 1, further comprising:
caching portions of a file in different ones of the plurality of data storage nodes.

12. A method as recited in claim 1, wherein using the plurality of caches comprises:
receiving a write request directed to a dataset stored in the cluster;
determining a hash value based on a dataset identifier associated with the write request; and
determining a particular one of the data storage nodes in which to access the dataset in response to the write request, according to the hash value.

13. A method as recited in claim 12, wherein the plurality of data storage nodes contain only a single writeable copy of the dataset, and said determining a particular one of the data storage nodes in which to access the dataset comprises determining which of the data storage nodes contains the writeable copy of the dataset.

14. A method as recited in claim 1, further comprising:
dividing a volume stored in the network storage system into a first plurality of subsets;
striping the first plurality of subsets across a first level of caches of the plurality of caches in the network storage system;
identifying a particular subset of the first plurality of subsets as being frequently accessed; and
in response to identifying the particular subset as being frequently accessed, dividing the particular subset into a second plurality of subsets and spreading the second plurality of subsets across a second level of caches in the network storage system.

15. A method comprising:
maintaining a plurality of data storage nodes in a clustered network storage server system, each data storage node including an N-module and a D-module;
maintaining, in the N-module of each data storage node, a data structure indicating a mapping between D-modules and data identifiers of data stored in the clustered network storage system; and
spreading read and write accesses across the plurality of data storage nodes, including:
receiving at one of the N-modules a write request directed to a first dataset;
determining one of the D-modules at which to access the first dataset, based on the mapping and a data identifier indicated by the write request;
directing the write request to said one of the D-modules;
receiving at one of the N-modules a read request directed to a second dataset;
selecting by said one of the N-module either a caching D-module for the second dataset or a read-write D-module for the second dataset, from which to access the second dataset, based on an indication whether the second dataset has been updated at the read-write D-module within a threshold time; and
directing, by said one of the N-modules, the read request to either said caching D-module or said read-write D-module selected in said selecting.

16. A method as recited in claim 15, wherein said spreading further comprises:
directing all writes to a particular file to the same D-module, regardless of which N-module receives the write request to said file; and
directing reads of the file to a D-module selected based on an observed update frequency of the particular file.

17. A method as recited in claim 15, further comprising:
selectively enabling or disabling said spreading on a volume-by-volume basis.

18. A clustered network storage system comprising:
a plurality of storage nodes configured to operate as a cluster, each of the data storage nodes including a mass storage subsystem and a D-module associated therewith to manage back-end storage functions for the mass storage subsystem, each of the D-modules to implement a cache for primary data stored in one or more of the mass storage subsystems on one or more of the storage nodes other than the mass storage subsystem on the storage node with which the D-module is associated; and
a plurality of N-modules, each to receive data access requests via a network from one or more of a plurality of clients, such that each data access request received by any of the N-modules is mapped to a particular one of the D-modules for servicing so as to spread file system data and metadata access load across the plurality of data storage nodes, the plurality of N-modules configured to:
receive a write request directed to a first dataset;
determine one of the D-modules at which to access the first dataset, based on the mapping and a data identifier indicated by the write request;
direct the write request to said determined one of the D-modules;
receive a read request directed to a second dataset;
select either a caching D-module for the first dataset or a read-write D-module for the first dataset, from which to access the first dataset, based on the mapping and an indication whether the first dataset has been updated at the read-write D-module within a threshold time; and
direct the read request to either said selected caching D-module or read-write D-module.

19. A system as recited in claim 18, wherein each of the D-modules comprises a cache to store data of which a primary copy is stored in one or more of the mass storage subsystems other than the mass storage subsystem with which the D-module is associated.

20. A system as recited in claim 18, wherein each of the N-modules maintains a mapping of data identifiers to D-modules, and each of the N-modules directs write requests which it receives to an appropriate one of the D-modules based on the mapping and a data identifier in each of the write requests.

21. A system as recited in claim 20, wherein all write requests for any particular file are directed to the same D-module regardless of which N-module receives the write request.

22. A system as recited in claim 21, wherein each of the N-modules directs any read requests that it receives for a particular file to a D-module selected based on an update frequency of the file.

23. A system as recited in claim 18, wherein the plurality of data storage nodes collectively store a volume containing a plurality of individual files, including one or more read-only copies of each file of the volume and only one read-write copy of each file of the volume, wherein the one read-write copy of each file is stored in the cache in one of the data storage nodes, and wherein two or more read-only copies of a particular file of the volume are stored in the caches in different ones of the plurality of data storage nodes.

24. A system as recited in claim 18, wherein two or more of the D-modules are configured as cluster-failover partners.

* * * * *